Patented Jan. 9, 1940

2,186,021

UNITED STATES PATENT OFFICE 2,186,021

PROCESS FOR TREATING HYDROCARBONS

Melvin M. Holm and William H. Shiffler, Berkeley, Calif., assignors to Standard Oil Company of California, San Francisco, Calif., a corporation of Delaware No Drawing. Application March 9, 1936, Serial No. 67,917

18 Claims. (Cl. 196—10)

This invention relates to a new and useful process for the polymerization of normally gaseous olefine hydrocarbons and more particularly for polymerization wherein the product desired is a liquid boiling in the range of gasoline, useful as a fuel for internal combustion engines, and to catalysts for effecting such polymerization.

The possibility of polymerizing gaseous olefine hydrocarbons to liquids, while long recognized, has only become of considerable economic interest with the development of the petroleum cracking industry in which large quantities of the lighter unsaturates are produced as a low value by-product. Various thermal and catalytic methods have now been proposed for converting such raw material into valuable commercial products. Among the more promising catalytic methods are those which employ the strong acids in one form or another as the catalyst.

It has long been known that liquid phosphoric acid and certain of its normal and acid salts have the ability, under a wide range of conditions, to polymerize olefines containing from two to five or more carbon atoms. During the past few years it has been further found that when the conditions of polymerization with a phosphoric type catalyst are correctly chosen and properly controlled a polymer product may be produced which has certain outstanding advantages in the preparation of high anti-knock motor fuels. Much has already been accomplished in determining the optimum conditions leading to the highest yields of the most desirable product for any specific such use and in applying them to full scale commercial operation. The development of specific catalysts to meet the diverse and exacting demands of such operation has, however, failed to keep pace and as a result this otherwise promising new industry is still considerably hampered for want of an entirely satisfactory catalyst.

When the olefine polymerizing reaction is attempted with ordinary liquid orthophosphoric acid merely by bubbling the olefine as a gas through a bulk of acid, two major difficulties are encountered: First, the rate of the reaction under conditions leading to a high conversion of olefine to a desirable product is very low and, second, the corrosivity of liquid acid of the proper strength under such conditions, on otherwise practical equipment, is particularly high. These undesirable features have to a considerable extent been overcome through the development of so-called "solid phosphoric acid catalysts." In these the acid is absorbed in diatomaceous earth and calcined at a fairly high temperature. The dry solid reaction product which may then in reality be a silicon phosphate is materially less corrosive and is at the same time apparently, by reason of its high porosity, sufficiently active under suitable conditions of pressure and temperature.

This improvement over the bulk liquid acid catalyst was, however, not realized without the introduction of certain undesirable features which tend very largely to offset the advantages gained. For instance, the solid catalyst even though strong and rugged appearing when placed in the catalyst chamber has a decided tendency to disintegrate to a powder during use. It is also found to lose its activity otherwise than through powdering and hence to require revivification at rather frequent intervals. The only method known for such revivification is to burn out the offending materials, probably gums, resins and tars deposited in the catalytically active pores, in a current of oxygen or air. Even when this step is carried out with the most extreme care possible, considerable additional disintegration and powdering appears inevitable with the overall result that the number of cycles of active life of the catalyst is very definitely limited.

This, of course, necessitates periodic replacement of catalyst which together with idle time of the plant chargeable to revivification, very materially adds to the cost of product while at the same time increasing the complexity and decreasing the reliability of plant operation.

In addition to the foregoing economic disadvantages and operating difficulties encountered with hitherto known catalysts in which the catalytically active component is phosphoric acid or a phosphate, when employed for the polymerization of gaseous olefines to low boiling liquid motor fuels an even more seriously objectionable feature has now been recognized in the highly porous "solid phosphoric acid" catalyst which it appears may well be inherent in any porous catalyst in this use. It has, in fact, been found that with such catalysts the extent to which the polymerization reaction is permitted to proceed is very much more difficult of control than when the same active material in non-porous form is employed, the net result often being, as more fully hereinafter set forth, a very substantial loss in yield of the desired product.

It is accordingly the object of this invention to provide an improved process, for the conversion of gaseous olefines to low-boiling liquid polymers, and a catalyst for use therein which shall have none of the foregoing disadvantages and yet be simple of preparation, relatively inexpensive, of long active life, easily regenerated and capable of exact control in action.

The realization of this broad object is made possible through the discovery that when phosphoric acid is distributed in a thin even film over the surface of a non-reactive, non-porous, non-absorbent solid the disadvantages encountered in the use of the same acid in bulk are substantially eliminated while the major advantages without the disadvantages of the porous "solid phosphoric acid" catalysts are obtained.

In general the acids of phosphorus in the phosphoric (+5) state of oxidation begin to show appreciable activity in the polymerization of olefines containing from two to five carbon atoms at a concentration of about 80% $H_3PO_4$ or 58% $P_2O_5$ in water and pass through a practical maximum between about 95 and 115% $H_3PO_4$ corresponding to 68–83% $P_2O_5$. While probably of no especial significance it may be noted in passing that pyro-phosphoric acid, $H_4P_2O_7$, which corresponds to 110% $H_3PO_4$ or 79.7% $P_2O_5$ has been found to occupy substantially the peak of this maximum range of polymerizing activity.

As the carrier or support for thin films of acid in this concentration range it has been found that fragments or pellets of broken or fused non-porous quartz admirably satisfy all the requirements for a catalyst for use at any practical temperature. Various other non-porous and non-absorbent materials have been found satisfactory within the lower range of temperatures in which it is practical to catalytically polymerize olefines, i. e., from about 50° F. to 250° or 300° F. but due to increased reactivity with the strong phosphoric acids at higher temperatures they may not be employed in the upper practical range of catalytic olefine polymerization which is from 300° to about 500° F.

For use in the lower temperature range borosilicate, "Pyrex", glass particles, high chrome or chrome-molybdenum steel chips or turnings, copper and even lead pellets may be employed without excessive attack by the acid. In the higher range quartz or fused silica, pure silica sand, illium metal, a special chrome-nickel-molybdenum alloy, non-porous graphite, feldspar, hornblende, hard rubber and certain of the high melting, acid resistant synthetic resins have been found to offer more or less promise of practical utility. Of these broken quartz and quartz sand are readily available, are relatively inexpensive and, being entirely satisfactory throughout the whole practical temperature range, will usually be found the best choice.

Obviously it may be employed in specially prepared forms such as beads, pellets, annular rings, etc., however, such shapes afford so little additional surface for the support of acid film over that available in simply broken fragments as not to be warranted. In full commercial scale equipment 4 to 20 mesh and particularly 10–20 mesh fragments have been found appropriate with the gas velocities that are desirable in the polymerization reaction in question.

In the preparation of a catalyst of the type employed in the process of this invention it is desirable to distribute a thin, more or less, uniform film or coating of acid over the whole surface of the supporting body but to avoid so far as possible any excess of acid which might lodge as large drops in the interstices and in effect constitute both dead space and waste acid so far as the reaction is concerned. To this end it has been found advantageous, as more fully described and claimed in an application Serial No. 67,921 filed concurrently herewith, (Patent No. 2,135,793, November 8, 1938) to prepare the catalyst in place in the catalyst chamber by contacting the support previously placed therein with liquid phosphoric acid of considerably lower concentration than that which is ultimately to constitute the catalyst, permitting excess acid to drain off and then concentrating the acid in a current of gas of proper humidity.

As compared to a bulk liquid catalyst of the same acid strength a quartz supported acid-film catalyst so prepared is relatively noncorrosive to equipment since all the acid present is in a thin film adsorbed on the surface of the support and actual contact of acid with the walls of the catalyst chamber is possible only over a relatively small area.

There is no continual bathing of the chamber surfaces by liquid acid and hence no removal of the protecting layer of such reaction products as may be formed. As a result simple lead-lined equipment may be, and in fact has been, used for many months without appreciable deterioration, whereas with liquid phosphoric acid in the same service serious damage results in a few weeks.

The conventional manner of employing bulk liquid acid as an olefine gas polymerizing catalyst has been by bubbling the gas through the liquid either with or without solid surfaces present to break up and distribute the gas bubbles. A cubic foot of catalyst space filled with 100% $H_3PO_4$ and 10–20 mesh quartz as the baffle surface will contain about 52 pounds of acid whereas a cubic foot of the 10–20 mesh quartz-acid-film catalyst prepared as herein described will contain only about 3.5 to 5.0 pounds of acid, a maximum of 10% and an average of about 8% as much acid, and yet the acid-film catalyst will have a polymerizing activity per unit volume at least equal and usually superior to the liquid acid catalyst.

It is thus obvious that in having reduced corrosion to an entirely practical level and in having increased the catalytic activity per cost unit of acid by over 1200% the acid-film catalysts of the present invention constitute a material advance over the bulk acid catalysts of the prior art.

When compared with the aforementioned "solid phosphoric acid" catalysts an even greater superiority in economy must be ascribed to the acid-film catalysts together with still other and more fundamental advantages.

From 50 to 60 pounds of 100% $H_3PO_4$ is required for reaction with diatomaceous earth in the preparation of one cubic foot of 4–10 mesh "solid acid" or silicon phosphate catalyst. Its polymerizing activity measured in terms of low-boiling liquid polymer produced is, however, not materially greater per unit volume than that of an acid-film catalyst. Obviously in addition to this very large advantage in materials cost the acid-film catalysts are far less expensive to prepare since they may be prepared in place and require no calcining or equivalent treatment. Neither is any powdering or equivalent progressive loss requiring replacement necessary with the catalyst of this invention and such regeneration or reactivation as may be necessary at infrequent intervals is, as will be more fully explained hereinafter, of an extremely simple and inexpensive nature.

The really fundamental advantage in a catalyst consisting of an acid-film supported on a non-porous surface over the highly porous "solid acid" catalysts and probably over any porous solid catalyst in a polymerization reaction has, however, been found to reside in the exactness with which the extent of polymerization may be controlled. The significance of this feature can be easily appreciated from the consideration of a specific instance. In polymerizing butenes for the production of a liquid fuel boiling within the range of aviation gasoline, it is highly desirable that only the dimer should be formed since the trimer boils above the permissible range and hence each such molecule produced represents a loss of one and a half potential molecules of the desired fuel. While in actual practice in which a butane-butene cut from a petroleum cracking system or from a dehydrogenated natural gas constitutes the raw material for the polymerization process the situation will seldom be so simple the principle is exactly the same.

As a practical illustration data on actual polymer products from the same gas under conditions of polymerization controlled to give a maximum yield of aviation gasoline by an acid-film-on-quartz catalyst and by a highly porous "solid acid" catalyst are presented in the following table.

Table

| Run number | 20 | 21 | 11 | 23 |
|---|---|---|---|---|
| Catalyst | Acid-film | "Solid acid" | Acid-film | "Solid-acid" |
| Polymerization: | | | | |
| Temperature, °F | 300 | 300 | 230 | 250 |
| Pressure, atmospheres | 1 | 1 | 1 | 1 |
| Feed comp'n {Percent iso-butene | 44 | 46 | 40 | 45 |
| Percent 2-butene | 56 | 54 | 60 | 55 |
| Space velocity (vol. gas/vol. catalyst/min.@70° F.) | 0.64 | 0.69 | 0.74 | 2.70 |
| Percent entering olefine polymerized | 91 | 93 | 87 | 89 |
| Percent aviation gasoline in polymer | 74 | 57 | 76 | 68 |

It runs 20 and 21 under identical conditions of temperature, pressure, time and extent of olefine conversion the non-porous catalyst will be seen to have given a 30% higher yield of aviation gasoline than was obtained with the porous contact mass. In runs 11 and 23, wherein the apparent time of contact between the gas and the porous catalyst was reduced to a practical minimum in order to avoid as far as possible over-polymerization the non-porous catalyst still produced 12% more aviation gasoline than did the porous material.

Not only is the advantage of limiting over-polymerization through the use of a non-porous catalyst apparent in increased yields of the desired product, but it is also worth while in simplifying and improving plant operation. With less over-polymerization less tar and gum will be formed to ultimately require removal from the catalyst in regeneration or revivification treatments and with no pore space in the catalyst less of such products that may still be formed will find a lodging place and that which does fail to escape, being of necessity deposited on a smooth solid surface, may be more simply removed. The combined effect is, therefore, that the non-porous acid-film supported catalysts of the present invention require regeneration only at very infrequent intervals as compared to porous catalysts of the "solid acid" type, the regeneration is much less difficult to perform and is not attended with any permanent degradation.

Regeneration of an acid-film-on-quartz catalyst may be effected merely by washing off the acid with water followed by a simple washing of the quartz support in place with an appropriate solvent for tars and gums, steaming out residual solvent and replacing the acid. No burning operation is necessary and even though it be considered preferable to burn off rather than dissolve off the deposits from the catalyst support no careful control would be required since no damage to the quartz could result from any ordinary burning operation.

While the preparation and satisfactory use of the simple, efficient and economical polymerization catalysts herein described is in no way dependent upon a theoretical discussion of why they possess the outstanding advantages which have been described and demonstrated a simple explanation is apparent, now that the phenomenon has been discovered, which is entirely consistent with the observed facts.

A polymerization reaction is different from most chemical reactions which are ordinarily effected by means of catalysts in that it may, if not specifically stopped, proceed through any number of stages by mere repetition of the same mechanism that was responsible for the first stage. In order to produce high yields of a polymer corresponding to any given stage it is thus obviously imperative that the reaction be so effected that substantially all of the molecules built up may be stopped at the same point and none of them be permitted to continue to react through several or many additional stages. This, of course, requires that when the reaction is effected catalytically the catalyst must be uniformly active and uniformly accessible to the reactants. With any highly porous solid catalyst it is apparent that both such requisites are inherently impossible since even though both pore and external surfaces were equally active, which, from present views of heterogeneous catalysis, is probably not the case, the product of any given stage of polymerization could certainly less readily escape from further reaction when confined in a catalyst pore than when on an external surface. Obviously then the best that could be hoped for in control of the degree of polymerization effected by a porous catalyst would be a statistical average between under-polymerization at the external surface and over-polymerization deep in the pores.

In a case where the degree of polymerization desired is high and consequently a few stages more or less would have little relative effect on the nature of the product such a statistical average might be entirely satisfactory. At the opposite extreme, however, where one stage of polymerization gives the desired product and two stages a product which falls entirely without the desired range a catalyst permitting only a statistical average control obviously could never be really satisfactory.

While the specific phosphoric acid-film catalysts which have been described are illustrative of a type of contact catalyst of particular utility in polymerization reactions in which the extent of polymerization must be closely controlled and, all factors considered, approach closely the ideal for the controlled polymerization of gaseous olefines, it is obvious that both other acids possessing polymerizing power and other non-porous supports than those specifically herein mentioned and various combinations of such groups may be employed without departing from the principle herein taught and exemplified.

While phosphoric acid-film on quartz catalysts may be advantageously employed in the conversion of any available olefine or mixture of olefines containing from two to five carbon atoms either alone or admixed with other gases, as when contained in cracking still gases or cracked or dehydrogenated natural gas, to light liquid motor fuels of very high antiknock value, in general, the ease and simplicity of control of the polymerization reaction and hence of the product will be found to be better the more uniform the raw material.

In the process of this invention the catalyst may be prepared in situ in a suitable chamber, as previously indicated, or when preferred by reason of special circumstances may be prepared outside and introduced into the catalyst chamber and the acid brought to the desired concentration, usually about 110% $H_3PO_4$ or 79.7% $P_2O_5$. The gas ultimately to be polymerized may conveniently be employed for this purpose since it must contain water vapor at a partial pressure equal to the vapor pressure over 110% $H_3PO_4$ at the temperature to be employed in polymerization in order that the catalyst may remain constant throughout the reaction. With a nominal butane-butene cut from a petroleum cracking operation polymerization is conveniently effected at about 200 pounds per square inch gauge pressure and a temperature of about 300° F. and hence the gas should contain water vapor at a partial pressure of from 0.2 to 0.5 millimeter of mercury.

Since the olefine containing gases from petroleum cracking usually contain varying quantities of compounds which may either poison the catalyst or contaminate the product or both they should be appropriately purified before contacting the catalyst. Such purification is conveniently effected, as more fully disclosed and claimed in an application Serial No. 67,918 filed concurrently herewith, by scrubbing the gas successively with appropriate dilute acid and alkaline solutions before it is brought to the required equilibrium water vapor pressure. When the gas requires to be dried to attain the desired water content, as is usually the case for operating with the more concentrated acid catalysts at temperatures below 400° F., calcium chloride, barium perchlorate or any other ordinary dessicant which is non-reactive with gaseous olefines may be employed in convenient apparatus.

The olefine polymerizing reaction being exothermic it is highly important that the catalyst chamber should be of such design as to permit of the ready dissipation of heat. The significance of this feature may be readily appreciated from the fact that a gas containing 40% of butenes when undergoing 95% polymerization will liberate heat enough to raise the temperature of the reaction mixture by more than 200° F. A suitable apparatus has been found to consist of a number of relatively elongated chambers which may be connected either in series or in parallel. With such a system it is obviously possible to provide for the removal of heat as well as reaction product, if desired, at various points during the passage of any given charge of gas through the process.

In operation on a butane-butene cut at 200 pounds per square inch, the feed being a liquid at atmospheric temperature may be so metered to the apparatus, and rates may then be expressed in definite units rather than in terms of the often ambiguous so called "space velocity". For such a cut and a reaction temperature from 150–400° F. a convenient charging rate has been found to be about 2 gallons per hour per cubic foot of 10–20 mesh quartz—110% $H_3PO_4$ acid-film catalyst. Under such conditions with proper purification and humidity control of the charge and proper temperature control in the catalyst chamber the catalyst will retain its activity for several months and produce many hundreds of gallons of light liquid product per cubic foot between revivification treatments.

Such efficient operation together with the simplicity, ruggedness and low first-cost of the catalyst and the already emphasized superior characteristics of the product combine to give an over-all result not hitherto realized.

Having described a novel and useful process and specific means for its execution we claim:

1. A process of polymerizing olefine hydrocarbons which comprises contacting olefine containing material with a catalyst comprising a thin film of an active polymerizing agent distributed over and adsorbed on the surface of particles of a non-porous inert solid material.

2. A process of polymerizing olefine hydrocarbons which comprises contacting olefine containing material with a catalyst comprising phosphoric acid corresponding to 68 to 83% $P_2O_5$ distributed in a thin film over the surface of particles of non-porous silica.

3. A process for the polymerization of normally gaseous olefine hydrocarbons into low boiling liquids which comprises the step of contacting olefines containing from 2 to 5 carbon atoms per molecule with a catalyst comprising an active polymerizing agent distributed over and adsorbed in a thin film on the surface of a non-porous, inert solid material.

4. A process for the polymerization of normally gaseous olefine hydrocarbons into low-boiling liquid motor fuels which comprises the step of contacting olefines containing from 2 to 5 carbon atoms per molecule with a catalyst comprising an active polymerizing agent adsorbed in a thin film on the surface of a non-porous inert solid material.

5. A process for the polymerization of normally gaseous olefine hydrocarbons to low-boiling liquids which comprises the step of contacting olefines of from 2 to 5 carbon atoms per molecule with a catalyst comprising an active polymerizing agent of an acidic character adsorbed in a thin film on the surface of a non-porous inert solid material.

6. A process for the polymerization of normally gaseous olefine hydrocarbons to low-boiling liquids which comprises the step of contacting olefines of from 2 to 5 carbon atoms with a catalyst comprising a thin film of an active polymerizing inorganic acid adsorbed on the surface of a non-porous inert solid material.

7. A process for the polymerization of normally gaseous olefine hydrocarbons to low boiling liquid motor fuels which comprises the step of contacting olefines of from 2 to 5 carbon atoms with a catalyst comprising a thin film of an acid of phosphorus adsorbed on the surface of a non-porous, inert solid material.

8. A process for the polymerization of normally gaseous olefine hydrocarbons to low-boiling liquid motor fuels which comprises the step of contacting olefines of from 2 to 5 carbon atoms with a catalyst comprising a thin film of a phosphoric acid corresponding to from 58 to 100% $P_2O_5$ adsorbed on the surface of a non-porous inert solid material.

9. A process for the polymerization of normally gaseous olefine hydrocarbons to low-boiling liquid motor fuels which comprises the step of contacting olefines of from 2 to 5 carbon atoms with a catalyst comprising a thin film of a phosphoric acid corresponding to from about 68 to 83% $P_2O_5$ adsorbed on the surface of non-porous quartz.

10. A process for the polymerization of normally gaseous olefine hydrocarbons to low boiling liquid motor fuels which comprises the step of contacting olefines of from 2 to 5 carbon atoms per molecule with a catalyst comprising a thin film of a phosphoric acid corresponding to from about 68 to 83% $P_2O_5$ adsorbed on the surface of non-porous quartz, said contacting being at from 50° to 500° F.

11. A process for the polymerization of normally gaseous olefine hydrocarbons to low-boiling liquid motor fuels which comprises the step of contacting olefines of from 2 to 5 carbon atoms per molecule with a catalyst comprising a thin film of a phosphoric acid corresponding to from about 68 to 83% $P_2O_5$ adsorbed on the surface of non-porous quartz, said contacting being effected at a temperature of from 150° to 400° F.

12. A catalyst for the polymerization of olefine hydrocarbons which comprises an active polymerizing agent distributed over and adsorbed in a thin film on the surface of a non-porous, inert solid material.

13. A catalyst for the controlled polymerization of normally gaseous olefines to low-boiling liquids which comprises an active acidic polymerizing agent distributed as a thin film on the surface of a non-porous, inert solid material.

14. A catalyst for the controlled polymerization of normally gaseous olefines to low-boiling liquid motor fuels which comprises an active polymerizing inorganic acid adsorbed as a thin film on the surface of a non-porous, inert solid material.

15. A catalyst for the controlled polymerization of normally gaseous olefines to low-boiling liquid motor fuels which comprises a relatively concentrated acid of phosphorus adsorbed as a thin film on the surface of a non-porous, inert solid material.

16. A catalyst for the controlled polymerization of normally gaseous olefines to low-boiling liquid motor fuels which comprises a thin film of a phosphoric acid corresponding to from 58 to 100% $P_2O_5$ distributed over the surface of non-porous quartz.

17. A catalyst for the controlled polymerization of normally gaseous olefines to low-boiling liquid motor fuels which comprises a thin film of a phosphoric acid corresponding to from about 68 to 83% $P_2O_5$ distributed over the surface of non-porous quartz.

18. A catalyst for the controlled polymerization of normally gaseous olefines to low-boiling liquid motor fuels which comprises a phosphoric acid of strength corresponding to from about 68 to 83% $P_2O_5$ distributed on the surface of 10–20 mesh non-porous quartz in amount equivalent to about 3.6 pounds of $P_2O_5$ per cubic foot of quartz particles.

MELVIN M. HOLM.
WILLIAM H. SHIFFLER.